(12) United States Patent
Jackson

(10) Patent No.: US 9,261,217 B2
(45) Date of Patent: Feb. 16, 2016

(54) EXPANDABLE PIPELINE POINT-REPAIR DEVICE

(71) Applicant: Smart Lock Pty Ltd., West Melbourne (AU)

(72) Inventor: Gary Jackson, Osborne Park (AU)

(73) Assignee: SMART LOCK PTY LTD, West Melbourne (AU)

( * ) Notice: Subject to any disclaimer, the term of this patent is extended or adjusted under 35 U.S.C. 154(b) by 0 days.

(21) Appl. No.: 14/640,673

(22) Filed: Mar. 6, 2015

(65) Prior Publication Data

US 2015/0176746 A1  Jun. 25, 2015

Related U.S. Application Data

(63) Continuation of application No. 14/554,434, filed on Nov. 26, 2014.

(51) Int. Cl.
*F16L 55/163* (2006.01)

(52) U.S. Cl.
CPC .................................... *F16L 55/163* (2013.01)

(58) Field of Classification Search
CPC ... F16L 55/163; F16L 55/1651; F16L 55/179; F16L 55/18
USPC .................................................... 138/97, 98
See application file for complete search history.

(56) References Cited

U.S. PATENT DOCUMENTS

| | | | |
|---|---|---|---|
| 2,684,860 A | | 7/1954 | Rafferty |
| 4,197,880 A | * | 4/1980 | Cordia ............................ 138/99 |
| 5,035,539 A | * | 7/1991 | Kawafuji et al. ........... 405/184.2 |
| 5,096,332 A | * | 3/1992 | Kawafuji ....................... 405/157 |
| 5,351,720 A | * | 10/1994 | Maimets ......................... 138/98 |
| 6,138,718 A | * | 10/2000 | Maimets ......................... 138/98 |
| 6,142,230 A | | 11/2000 | Smalley et al. |
| 6,755,592 B2 | * | 6/2004 | Janssen ............... F16L 55/1645 138/97 |
| 7,146,689 B2 | | 12/2006 | Neuhaus et al. |
| 7,967,064 B2 | | 6/2011 | Cook et al. |
| 7,987,873 B2 | * | 8/2011 | Kiest, Jr. ............... F16L 55/163 138/97 |
| 2001/0039711 A1 | * | 11/2001 | Donnelly et al. ............... 29/450 |
| 2008/0193221 A1 | * | 8/2008 | Lee et al. ................... 405/184.2 |
| 2014/0191503 A1 | | 7/2014 | Skinner et al. |

OTHER PUBLICATIONS

Rauschusa.pdf—Rausch US Sep. 28, 2014.

* cited by examiner

*Primary Examiner* — Paul R Durand
*Assistant Examiner* — Vishal Pancholi
(74) *Attorney, Agent, or Firm* — Michael J. Feigin, Esq.; Feigin & Associates, LLC

(57) ABSTRACT

A pipeline point-repair device, comprising a generally cylindrical body portion, having a locking mechanism mounted on an exterior surface thereof, the generally cylindrical body portion being expandable by application of pressure to an inner surface thereof and an external layer including a resin, the external layer surrounding the exterior surface of the body portion.

16 Claims, 4 Drawing Sheets

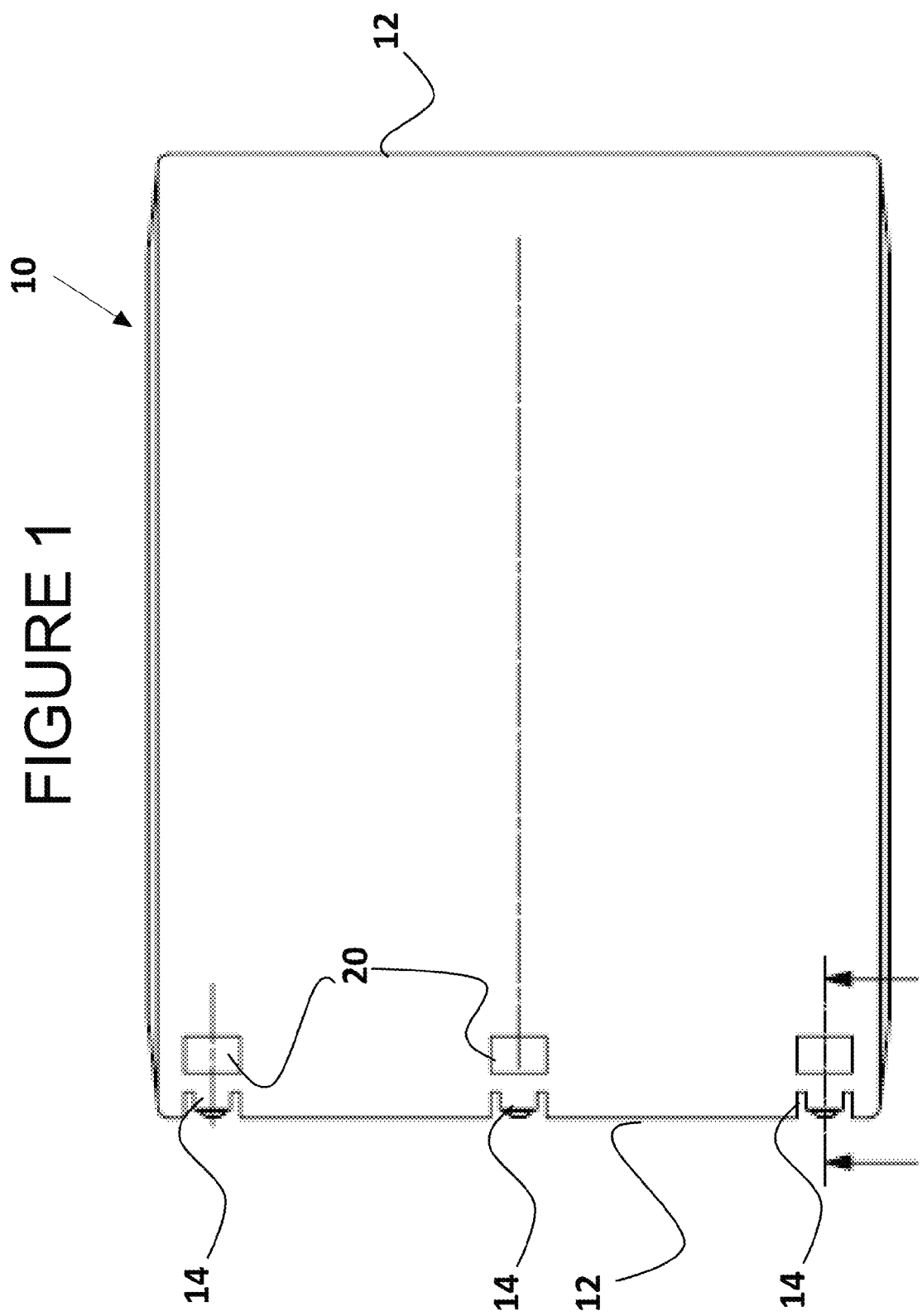

EXPANDABLE PIPELINE POINT-REPAIR DEVICE

BACKGROUND OF THE DISCLOSED TECHNOLOGY

Pipelines, such as storm water drain pipes, sewer pipes, oil pipes, and other kinds of pipes, occasionally crack, break, or have other local faults requiring repair. In the past, point repair of such pipelines often involved trenching or other methods for accessing the pipeline, which are time consuming and costly. As such, mechanical 'no-dig' point repairs have been the preferred method for repairing localized faults in pipelines.

However, existing no-dig point repairs are often not strong enough to ensure that the pipeline will not be broken again. For example, some existing point repair mechanisms are formed of metal only, and are not strong enough to ensure that tree roots or other obstructing growth will not re-damage the pipeline. Furthermore, many existing point repair mechanisms require lengthy curing times, making them labor and equipment intensive, and consequently also costly due to the need to bypass pump. Additionally, in existing systems the locking system of the point repair system is located within the conduit being repaired, thereby at least partially obstructing the conduit or leaving catch points for waste material to catch on and potentially block the pipe.

There is thus a need in the art for a point repair system including metal as well as resin, which is strong enough to repair the pipeline while making sure that the repair remains strong for the long term, and having a closure mechanism which does not obstruct the conduit being repaired.

U.S. Pat. No. 2,684,860 to Rafferty discloses a quick lock ring seal coupling for conduits, which seal may be locked against inadvertent disconnection.

At the time of this writing, http://rauschusa.com/products/quicklock to Rausch USA discloses a point repair system for inside repair of pipes, using only a stainless steel sleeve with rubber outer cover and no resin or fibreglass. The repair sleeve is expanded within the pipe being fixed, and is locked into position therein.

U.S. Pat. No. 6,142,230 to Smalley et al. discloses a wellbore tubular patch for patching a hole in a wellbore, the patch having an expandable bottom member and being formed of a metal having an outer wrapper of fiberglass.

SUMMARY OF THE DISCLOSED TECHNOLOGY

The disclosed technology described herein addresses a need, unfulfilled in the prior art, for providing a point-repair device for pipelines in which the locking system does not intrude on the repaired conduit, the curing time is relatively short, and the fault in the pipeline is not likely to reform.

In accordance with one aspect of an embodiment of the disclosed technology, there is provided a pipeline point-repair device, comprising a generally cylindrical body portion, having a locking mechanism mounted on an exterior surface thereof, the generally cylindrical body portion being expandable by application of pressure to an inner surface thereof and an external layer including a resin impregnated fiberglass mat, the external layer surrounding the exterior surface of the body portion.

In some embodiments, the cylindrical body portion has a circular cross section, the circular cross section having a first diameter in an initial state of the body portion and a second diameter in an expanded state of the body portion, the second diameter being greater than the first diameter. In some embodiments, the first diameter is at least 20% smaller than the second diameter.

In some embodiments, the body portion and the external layer are disposed within a pipe to repair a fault therein, and the second diameter corresponds to a diameter of the pipe.

In some embodiments, the locking mechanism comprises a ratcheting mechanism. In some embodiments, the locking mechanism comprises at least one locking tongue and at least one correspondingly placed slotted strap, the locking tongue being configured to engage a slot in the correspondingly placed slotted strap when the body portion is expanded.

In some embodiments, the locking mechanism engages the external layer and the resin. In some such embodiments, when the resin in the external layer is cured, the locking mechanism is cured to the resin, thereby preventing a change of position of the locking mechanism.

In some embodiments, the device further comprises an inflatable packer for expanding the body portion, the packer including a rigid core, an inflatable sleeve surrounding the rigid core, an air supply disposed between the rigid core and the inflatable sleeve for inflating the inflatable sleeve, and a driving mechanism configured to drive the packer to an operational location.

In some embodiments, the inflatable packer is disposed within the body portion, such that the driving mechanism drives the packer and the body portion to the operational location within a pipe for repair thereof and inflation of the inflatable sleeve applies pressure to the inner surface of the body portion, causing expansion of the body portion, thereby to engage the pipe.

In some embodiments, the external layer comprises fiberglass. In some embodiments, the external layer further comprises any one of, or all of resins, needle felt, and/or one or a plurality of restraining straps.

In accordance with another aspect of an embodiment of the disclosed technology, there is provided a method for repairing a pipe, comprising: forming a generally cylindrical body having a locking mechanism mounted on an exterior surface thereof, the generally cylindrical body portion being expandable by application of pressure to an inner surface thereof; placing an inflatable packer within the body portion; surrounding the exterior surface of the body portion with an external layer including a resin; driving the packer, the body portion, and the external layer within a pipe to a location requiring repair; inflating the inflatable packer, thereby expanding the body portion to engage an interior surface of the pipe; and curing the resin thereby to secure the body portion in the location in the pipe.

In some embodiments, the forming the cylindrical body portion comprises forming a body portion having a circular cross section having a first diameter, and the expanding comprises expanding the circular cross section to have a second diameter, greater than the first diameter. In some embodiments, the first diameter is at least 20% smaller than the second diameter.

In some embodiments, the forming a body portion comprises forming a body portion including a ratcheting mechanism as the locking mechanism. In some embodiments, the forming a body portion comprises forming a body portion including at least one locking tongue and at least one correspondingly placed slotted strap, the locking tongue being configured to engage a slot in the correspondingly placed slotted strap when the body portion is expanded.

In some embodiments, surrounding comprises engaging the locking mechanism with the external layer and the resin. In some embodiments, the curing comprises curing the locking mechanism to the resin, thereby preventing a change of position of the locking mechanism once cured.

In some embodiments, the placing an inflatable packer comprises placing an inflatable packer including a rigid core, an inflatable sleeve surrounding the rigid core, an air supply disposed between the rigid core and the inflatable sleeve for inflating the inflatable sleeve, and a driving mechanism configured to drive the packer within the pipe. In some such embodiments, the driving comprises using the driving mechanism, delivering the body portion and the external layer to the location in the pipe. In some such embodiments, the inflating comprises using the air supply, supplying air to the sleeve thereby to inflate the sleeve.

BRIEF DESCRIPTION OF THE DRAWINGS

FIG. 1 shows top plan view of a pre-rolled pipeline point-repair device of embodiments of the disclosed technology.

DETAILED DESCRIPTION OF EMBODIMENTS OF THE DISCLOSED TECHNOLOGY

Figure 3:
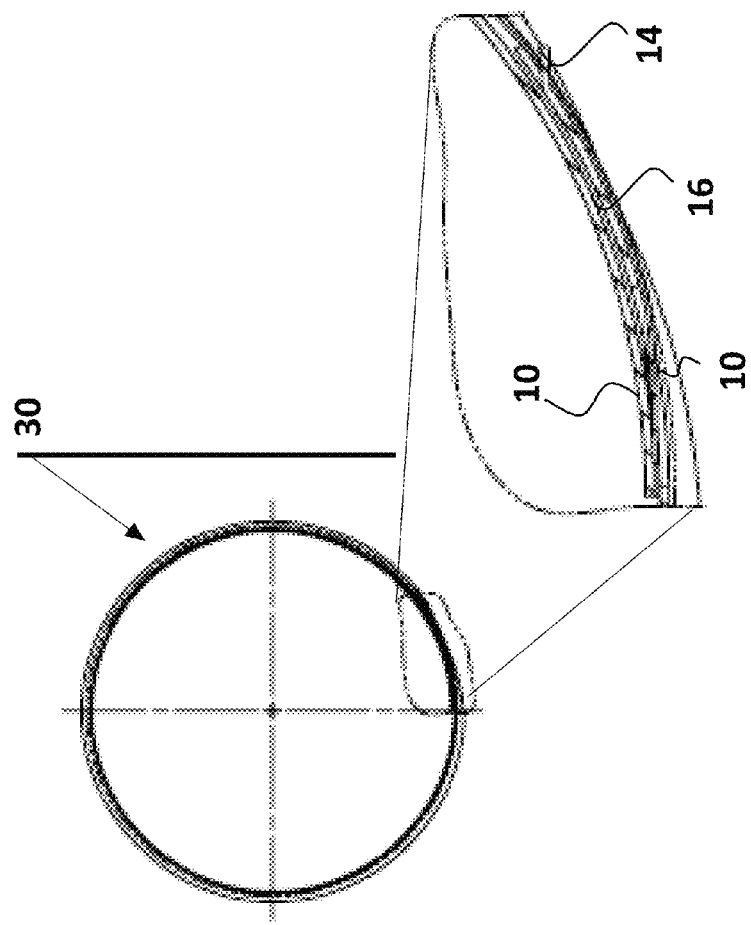
FIG. 3 shows a sectional view of a pipeline point-repair device of embodiments of the disclosed technology.

The presently disclosed technology is directed towards a point-repair device for pipelines in which the racket locking mechanism does not intrude on the repaired conduit. Additionally, the point-repair device of the disclosed technology provides for short curing time and a permanent solution so that the fault in the pipeline will not re-form.

FIG. 1 shows a top plan view of a pre-rolled pipeline point-repair device of embodiments of the disclosed technology. As seen, a flat sheet 10 of a suitable material, such as a sheet of 0.9 mm or 1.20 mm 316/316L stainless steel, is cut to suitable dimensions. The dimensions of sheet 10 are selected based on the diameter of the pipeline or conduit in which the point-repair device is to be installed, and on the size or length of the fault in the pipeline. In some embodiments, the width of the sheet 10 is somewhat greater than the circumference of the pipeline to be repaired, to allow for some overlap of material in the point repair device, as explained hereinbelow. In some embodiments, the length of the flat sheet 10 and the resulting point-repair device, and consequently the length of two edges 12 of the flat sheet 10, is at least 400 mm long, but may be longer based on the application.

One of edges 12 of the flat sheet 10 is cut to form a plurality of male locking tongues 14, which, during installation of the device, will become the male section of the locking mechanism. In some embodiments, at least three locking tongues 14 are formed. The locking tongues may have any suitable dimensions. However, in some embodiments, the locking tongues are at least 10 mm long and at least 15 mm wide.

A plurality of slotted straps 16 are welded onto, or otherwise connected to, flat sheet 10 in-line with locking tongues 14, such that each locking tongue 14 has a corresponding slotted strap 16. Each of straps 16 includes a plurality of slots 18, each designed to receive the corresponding tongue 14 during installation of the point repair device, as explained hereinbelow.

In some embodiments, flat sheet 10 is machined to include a plurality of angled teeth 20 protruding from an external side thereof. The teeth 20 are designed to ensure that once the point-repair device is in position, it will not change its dimensions, circumference, or position, of the point-repair device, as explained hereinbelow.

Figure 2:
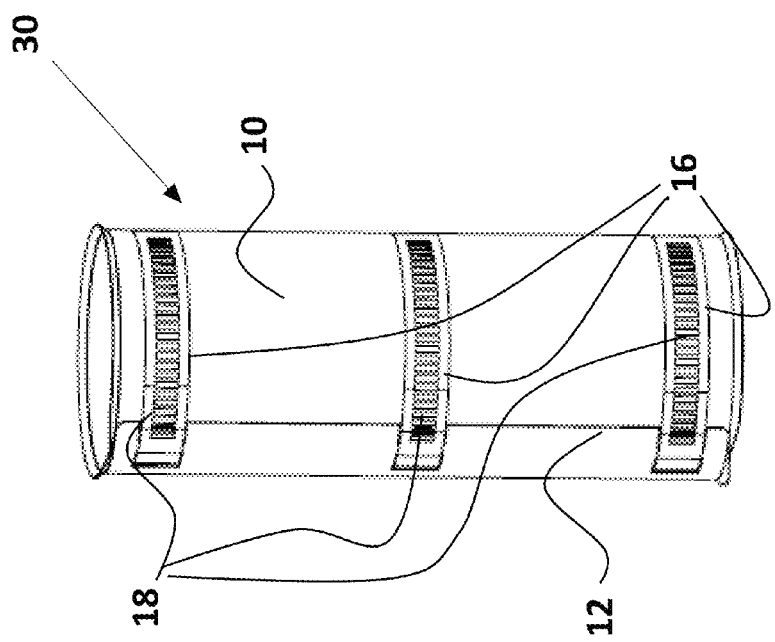
FIG. 2 shows a perspective view of a formed pipeline point-repair device of embodiment of the disclosed technology, formed of the structure of FIG. 1.

FIG. 2 shows a perspective view of a pipeline point-repair device of embodiment of the disclosed technology, formed of the structure of FIG. 1. FIG. 3 shows a sectional view of a pipeline point-repair device of embodiments of the disclosed technology.

As seen with particular clarity in FIG. 2, the flat sheet 10 is rolled into a cylinder, thereby forming the main body 30 of a point repair device 40. Typically, the sheet 10 is rolled into a cylinder having a circumference smaller than the circumference of the pipeline in which the point repair device is to be installed, and than the desired circumference of the completed repair. In some embodiments, the cylinder has a circumference 20% smaller than the circumference of the pipeline. For example, if the device is designed to have a nominal pipe size (NPS), also known as a nominal diameter (DN), of 6 inches, the cylinder is rolled to have a diameter of approximately 4.75 inches, so that the cylinder can travel freely within the intended pipeline. Typically, the flat sheet 10 is rolled more than 360 degrees, such that cylinder 30 includes an overlapping section, seen with particular clarity in FIG. 3. This prevents gaps from appearing even when the point-repair device is expanded within the conduit or pipeline.

Figure 4:
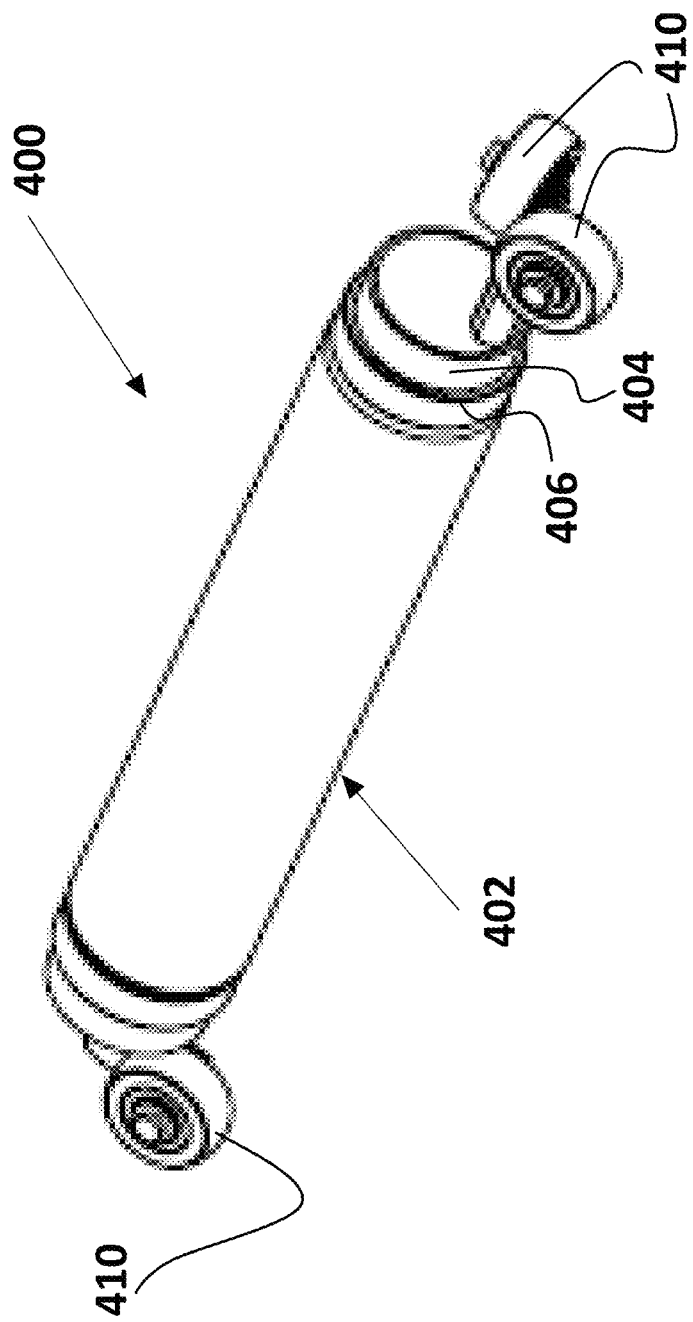
FIG. 4 shows a perspective view of an expandable packer according to the disclosed technology, used for installation of the pipeline point repair device of FIGS. 2 and 3.

FIG. 4 shows a perspective view of an inflatable packer according to the disclosed technology, used for installation of the pipeline point repair device of FIGS. 2 and 3.

As seen in FIG. 4, an inflatable packer 400 includes a body portion 402 which, in some embodiments, is approximately 40 inches long. Body portion 402 is reversibly inflatable, such that it may be inflated to a desired degree, and then deflated back to the deflated position. As such, the inflatable packer 400 may be reused multiple times, each time inflating and deflating body portion 402 as necessary.

In some embodiments, body portion 402 includes an internal barrel 404 surrounded by an inflatable sleeve 406. In some embodiments, the internal barrel 404 is made of a non-inflatable material such as stainless steel or aluminum/aluminium. In some embodiments, inflatable sleeve 406 comprises an extruded rubber sleeve which is sufficiently thick, for example having a thickness of approximately 25 mm. An air filling fitting 408 is typically disposed between barrel 404 and sleeve 406, enabling passage of air between the barrel and the sleeve thereby causing the sleeve to expand and be inflated.

Typically, body portion 402 has mounted thereon a driving mechanism, such as a plurality of wheels 410, for delivery of the packer 400 to the appropriate position within the pipeline.

Figure 5B:
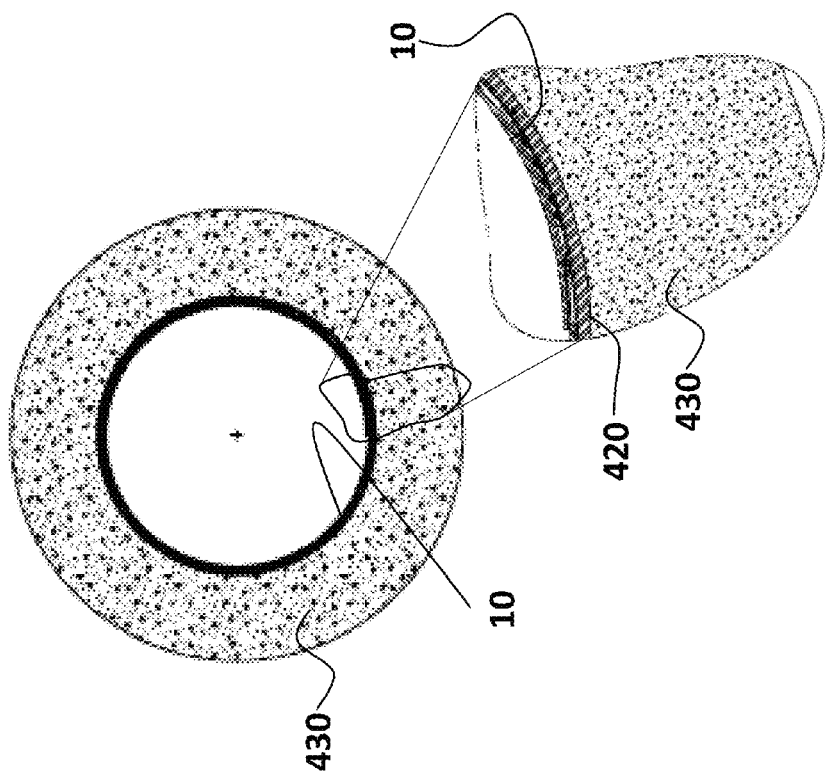
FIGS. 5A and 5B, respectively, show a schematic perspective view and a sectional view of a pipeline point-repair device according to the disclosed technology, when installed in a pipeline.
Figure 5A:
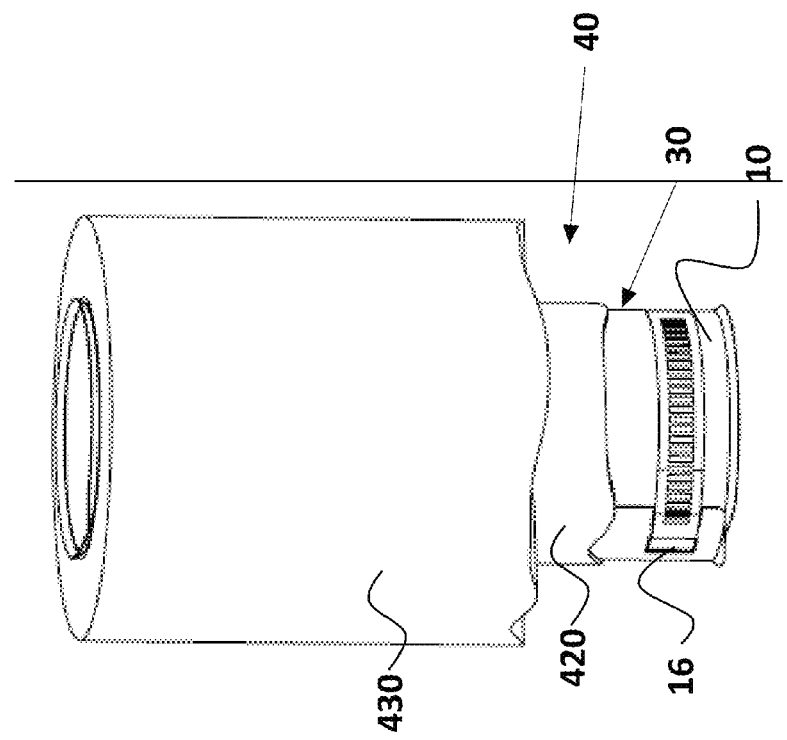

FIGS. 5A and 5B, respectively, show a schematic perspective view and a sectional view of a pipeline point-repair device according to the disclosed technology, during installation thereof in a pipeline.

As seen in FIGS. 5A and 5B, for use, the main body 30 of the point-repair device 40 is pulled onto packer 400, such that the packer 400 at least partially fills the bore in the cylinder of main body 30. A fiberglass mat 420 which is impregnated with a silicate resin is then placed surrounding an exterior surface of main body 30 and is secured thereto, thereby covering locking tongues 14 and straps 16 of cylinder 30, which are shown with clarity in FIGS. 1 to 3.

The packer 400 together with the point repair device 40 and the fiberglass mat 420 is driven into a pipe 430 requiring repair, typically through manholes, access chambers, or open pits. Subsequently the packer 400 is pulled or pushed into a predetermined position requiring repair, and the sleeve 406 and the packer 400 is inflated using suitable pressure till it reaches the desired circumference. The pressure applied by inflating sleeve 406 onto the interior of the main body 30 causes expansion of the cylinder of main body 30, such that the expanded diameter and circumference of the point repair device 40 correspond to the diameter and/or circumference of the pipe 430. Subsequently, the resin in fiberglass mat 420 is cured over a period of 1 to 2 hours, thereby adding to the strength of the point-repair device.

Due to expansion of main body 30, locking tongues 14 engage one of slots 18 on slotted straps 16, and lock therein, for example by ratcheting along the slots till the desired position. Additionally, due to the positioning of the fiberglass mat 420 and the resin included therein on the exterior of main body 30, locking tongues 14 and straps 16, when locked, as well as protrusions 20, engage with and are cured to the resin in fiberglass mat 420, thereby preventing the main body 30 from moving from the desired position and/or from having a diameter and circumference corresponding to those of the pipe 430. It should be understood that the pipe used and locking mechanism can be of any reasonable size and the locking mechanism can increase in diameter about, substantially, or exactly ½ inch, 10 mm, 15, mm, or 20 mm. For example, for American standard size pipes, the locking mechanism can have a diameter which increases from 5¾ in to 6¼ inch when fully expanded. Locking mechanisms can be used for pipes up to and including 29¾ inches or more. For metric sized pipes, the locking mechanism can be between, inclusive, 100 mm to 910 mm or more.

It is a particular feature of the disclosed technology that the locking mechanism is placed on the exterior of the body portion 30, thereby ensuring that the locking mechanism does not obstruct flow through the repaired pipe, or otherwise interfere with functionality.

It is a further feature of the disclosed technology that the locking mechanism is placed between the cylinder of main body 30 and the fiberglass mat 420, such that when the resin in the fiberglass mat is cured the locking mechanism is secured in place, and the location and dimensions of the cylinder cannot change.

It is yet a further feature of the disclosed technology that the metal cylinder of main body 30 remains radially interior to fiberglass mat 420 and the cured resin therein, thereby providing structural integrity to the point repair device, and ensuring that obstructing objects, such as tree roots, may not penetrate the point repair device and cause additional faults subsequent to installation of the point repair device 40.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein above are also contemplated and within the scope of the invention.

I claim:

1. A pipeline point-repair device, comprising:
   a generally cylindrical body portion, having a locking mechanism mounted on an exterior surface thereof, said generally cylindrical body portion being expandable by application of pressure to an inner surface thereof; and
   an external layer including a silicate resin, said external layer surrounding said exterior surface of said body portion, said external layer comprising a fiberglass mat, and said silicate resin being curable and being impregnated in said fiberglass mat,
   wherein an external surface of said locking mechanism engages an internal surface of said external layer and said silicate resin included therein, and
   wherein when said silicate resin in said external layer is cured, said external surface of said locking mechanism is cured to said internal surface of said resin such that said locking mechanism is disposed between said body portion and said cured external layer, thereby preventing a change of position of said locking mechanism and binding together said cylindrical body portion and said external layer.

2. The device of claim 1, wherein said cylindrical body portion has a circular cross section, said circular cross section having a first diameter in an initial state of said body portion and a second diameter in an expanded state of said body portion, said second diameter being greater than said first diameter.

3. The device of claim 2, wherein said first diameter is at least 20% smaller than said second diameter.

4. The device of claim 2, wherein said body portion and said external layer are disposed within a pipe to repair a fault therein, and said second diameter corresponds to a diameter of said pipe.

5. The device of claim 1, wherein said locking mechanism comprises a ratcheting mechanism.

6. The device of claim 1, wherein said locking mechanism comprises at least one locking tongue and at least one correspondingly placed slotted strap, said locking tongue being configured to engage a slot in said correspondingly placed slotted strap when said body portion is expanded.

7. The device of claim 1, wherein said body portion does not include said silicate resin.

8. The device of claim 1, also comprising an inflatable packer for expanding said body portion, said packer including:
   a rigid core;
   an inflatable sleeve surrounding said rigid core;
   an air supply disposed between said rigid core and said inflatable sleeve for inflating said inflatable sleeve; and
   a driving mechanism configured to drive said packer to an operational location.

9. The device of claim 8, wherein said inflatable packer is disposed within said body portion, such that:
   said driving mechanism drives said packer and said body portion to a said operational location within a pipe for repair thereof; and
   inflation of said inflatable sleeve applies pressure to said inner surface of said body portion, causing expansion of said body portion, thereby to engage said pipe.

10. A method for repairing a pipe, comprising:
    forming a generally cylindrical body having a locking mechanism mounted on an exterior surface thereof, said generally cylindrical body portion being expandable by application of pressure to an inner surface thereof;
    placing an inflatable packer within said body portion;
    surrounding said exterior surface of said body portion with an external layer including a silicate resin, said external layer comprising a fiberglass mat and said silicate resin being curable and being impregnated in said fiberglass mat, said surrounding comprising engaging an external surface of said locking mechanism with an internal surface of said external layer and said silicate resin;

driving said packer, said body portion, and said external layer within a pipe to a location requiring repair;

inflating said inflatable packer, thereby expanding said body portion to engage an interior surface of said pipe; and curing said resin thereby to secure said body portion in said location in said pipe, by curing said external surface of said locking mechanism to said internal surface of said silicate resin such that said locking mechanism is disposed between said body portion and said external layer, thereby preventing a change of position of said locking mechanism and binding together said cylindrical body portion and said external layer.

11. The method of claim 10, wherein said forming said cylindrical body portion comprises forming a body portion having a circular cross section having a first diameter, and said expanding comprises expanding said circular cross section to have a second diameter, greater than said first diameter.

12. The method of claim 11, wherein said first diameter is at least 20% smaller than said second diameter.

13. The method of claim 10, wherein said forming a body portion comprises forming a body portion including a ratcheting mechanism as said locking mechanism.

14. The method of claim 10, wherein said forming a body portion comprises forming a body portion including at least one locking tongue and at least one correspondingly placed slotted strap, said locking tongue being configured to engage a slot in said correspondingly placed slotted strap when said body portion is expanded.

15. The method of claim 10, wherein said forming comprises forming said body portion without said silicate resin being included therein.

16. The method of claim 10, wherein:

said placing an inflatable packer comprises placing an inflatable packer including:

a rigid core;

an inflatable sleeve surrounding said rigid core;

an air supply disposed between said rigid core and said inflatable sleeve for inflating said inflatable sleeve; and a driving mechanism configured to drive said packer within said pipe;

said driving comprises using said driving mechanism, delivering said body portion and said external layer to said location in said pipe; and said inflating comprises using said air supply, supplying air to said sleeve thereby to inflate said sleeve.

* * * * *